Aug. 29, 1939. H. SCHÄFER 2,170,931
METHOD FOR THE PRODUCTION OF PATTERNED OBJECTS FROM
POWDERED MATERIALS AND THE LIKE
Filed June 14, 1937
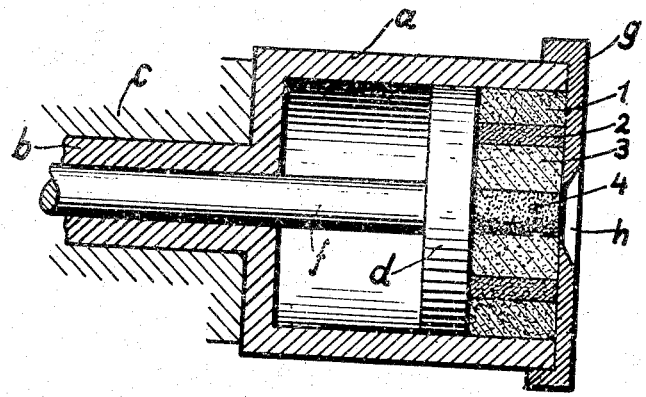
Inventor:
Hans Schäfer
by S. Sokal
Attorney Patented Aug. 29, 1939

2,170,931

UNITED STATES PATENT OFFICE 2,170,931

METHOD FOR THE PRODUCTION OF PATTERNED OBJECTS FROM POWDERED MATERIALS AND THE LIKE

Hans Schäfer, Wuppertal-Barmen, Germany

Application June 14, 1937, Serial No. 148,161
In Germany June 17, 1936

10 Claims. (Cl. 18—55)

An application has been filed in Germany on June 17, 1936.

This invention relates to a method for the production of mottled (patterned, ornamented) objects from moulding powders of all kinds, such as, for example urea-formaldehyde resins, in which the pattern extends throughout the thickness of the object from the front to the back thereof.

The hitherto known methods for the production of patterned objects from moulding powders—that is to say powder-like substances, in which the objects obtain their final form by the application of pressure or heat, or by the combined application of pressure and heat, suffer from the disadvantage that the coloured pattern of the objects is produced mostly only upon the face of the objects. If, in accordance with the methods known heretofore a design or pattern, extending throughout the body of the object is to be produced, considerable difficulties arise and such detailed measures are necessitated, that thereby the economy of the process is considerably prejudiced.

In particular a mottling or pattern, consisting of concentric rings, extending throughout the object from front to back, such as occurs in natural mottled articles like horn, wood and similar natural grown substances, can only be imitated with considerable difficulty and in an incomplete manner.

It was, therefore, the problem, to develop a process, by means of which patterned objects with the patterns extending throughout the body can be produced in a simple manner from moulding powders.

This problem is solved by means of this invention which consists in subjecting the differently coloured moulding powders for producing the mottled or patterned effects to centrifugal action in a mould, rotating around its own axis, whereby the differently coloured powders are suitably distributed and arranged in layers. The speed of rotation of the mould and also the shape thereof preferably conform to the powder to be treated and the intended pattern or design. For this purpose the mould can be arranged to rotate in any desired position between the vertical and the horizontal. The moulds can advantageously be provided with inserts which suitably influence the final shape of the object to be produced. Objects which, for example, owing to their special form or design cannot or are not to be entirely produced in the rotating mould are suitably formed indirectly from a preliminary workpiece produced in the rotating mould and, if desired, precompressed by a further pressing or other treatment.

By means of this new method the production of objects mottled or patterned throughout the thickness thereof is greatly simplified and at the same time an unlimited number of varied novel designs can be produced in this way.

The method of carrying out the new process depends essentially in that, owing to the centrifugal force set up, the powder introduced into the mould is projected against the wall of the mould and held there in a more or less ring-like layer. Further powder introduced into the mould is projected against the first layer, it being possible to produce variations of pattern by choice in the speed of rotation of the mould and the position of the mould. In order to produce particular forms or patterns the mould can be provided either at the beginning or during the working operation with insertion pieces which consist preferably of lightly compressed and, if desired, preliminarily patterned (mottled) powder. When the mould has been sufficiently filled with moulding powder suitable to the desired purpose, the rotation thereof is interrupted and the object is put into its final shape by pressure or heat or both.

For the production of rod-like articles having a cylindrical pattern extending therethrough, the mould is preferably rotated around a horizontal axis whilst for producing disc-like articles, the mould is advantageously rotated around a vertical axis.

If an object owing to its special shape or pattern cannot be completely formed in the rotating patterning mould, or if this is not suitable for other reasons, then a rough body or blank corresponding in size and patterning to the object to be produced is made in the rotating mould which can then be used for preparing the final article. If this immediate further working is not to be recommended for any reason, then the preliminarily prepared blank can be formed by pressure and, if desired, heat, into a transportable and preliminarily pressed article, capable of being stored, the further working of which can be effected at any suitable time later on.

The advantage of the new method consists further in that its use is not limited to definite moulding powders. The method is suitable not only for moulding powders in powdery condition, but also for coarse grained, chipped or other waste materials or sprayed materials provided they can be stratified under the influence of centrifugal force.

In the accompanying drawing the manufacture of an object in accordance with the new method and the hollow mould employed therefor is illustrated in one embodiment by way of example.

Referring to the drawing:

*a* is a cylindrical mould which is rotatably carried with its hollow shaft *b* in bearings *c*. Through the hollow shaft extends a shaft *f* the front end of which carries a piston or plunger-like plate *d* which, at the same time forms the displaceable bottom of the mould. The mould *a* is provided at its front end with a cover *g* adapted to be connected to the mould by means of a bayonet joint not shown. A filling opening *h* is disposed in the middle of this cover *g*.

If, now, an object is to be produced, in the present case a cylindrical object, then the bottom *d* of the mould is adjusted by displacing the shaft *f*, so as to vary the effective area of the mould to any desired extent in accordance with the size of the article or object to be produced. The mould *a* is then set in motion and the first kind of powder is introduced through the opening *h* by means of a suitable feeding device or ladle. The powder 1 is projected against the wall of the mould *a* owing to the centrifugal action set up on rotation of the mould and is there distributed and held more or less in the form of a ring. The second powder 2 which is of a different colour is, after its introduction into the mould, projected against the annular powder wall 1 and forms a second layer. The same result is obtained with the powder 3. Finally a core 4, which can consist of loose or, if desired, preliminarily pressed powder, is introduced. After the mould has been filled in this way the powder mass is, by pressing of the movable mould bottom, somewhat compressed and stiffened, whereupon, after removal of the cover, the entire pressed object can be forced out of the mould. If desired, after the removal of the cover, a ram, not shown on the drawing, can be applied and the moulded object converted by pressure or, according to the kind of powder employed, by heat or both, into a rigid body. In this finished body the pattern or design will be such that the different kinds of powder 1-4 are visible as rings on the end faces and extend through the whole body after the manner of concentric tubes. The requirement for a penetrating pattern is thus fulfilled.

The patterns obtained in the rotating mould consist, in general, of circular concentric rings. If another ring-like form is desired, such as, for example more oval rings, then this can be simply produced by exerting on the moulding lateral pressure transverse to the axes of the rings. In this way the moulding is suitably flattened. A preliminarily pressed or finished article is thus obtained in which the concentric patterning rings have a more or less oval shape as frequently occurs in the pattern rings of natural bodies, for example wood or horn, and which can be extensively reproduced in the above described manner.

The new method is particularly suitable for the production of artificial horn buttons having pattern rings which can serve as a substitute, for example, for genuine buffalo horn buttons. For the manufacture of such flat objects having pattern rings a long circular rod can first be prepared with the pattern extending throughout its length, and this rod can be divided into a number of disc-like tablets which then all have the same pattern and can be used to form a button. For the manufacture of such a rod with buffalo horn design the following ingredients can be used:

| | Grammes |
|---|---|
| 1. Base granular material | 37.50 |
| 2. Brown powder | 18.75 |
| 3. Base granular material | 31.25 |
| 4. Brown powder | 6.25 |
| 5. Base granular material | 25.00 |
| 6. Brown powder | 6.25 |
| 7. Base granular material | 6.25 |
| 8. Brown powder | 3.25 |
| 9. White powder | 1.62 |
| 10. Base granular material | 3.25 |
| 11. Core powder | 3.25 |
| 12. White powder | 1.62 |
| 13. Base granular material | 1.62 |
| 14. Brown powder | 1.62 |
| 15. Core powder | 1.62 |
| 16. White powder | 1.62 |
| | 150.72 |

The rod or bar thus formed is now finished by gentle pressure and is given, if desired by side pressure, a more or less oval cross section. Finally the rod is cut into a number, for example 30 tablets of about 5 grammes and then these are individually compressed whilst being heated and finished in the usual manner by boring, polishing etc.

Obviously the invention is not limited to the particular embodiment shown, as numerous other forms both for the process and also for the apparatus are possible and correspondingly the patterns or designs may vary considerably.

Having now particularly described and ascertained the nature of my said invention and in what manner the same is to be performed, I declare that what I claim is:

1. In a method of producing patterned objects, having the pattern extending throughout the thickness of the object from face to back from moulding powders of all kinds, colour and granulation, the steps of producing by centrifugal action, in a cylindrical mould, successive concentric layers of said powders, each of a different colour, and compressing said layers longitudinally; removing the so-formed object from the mould and then applying lateral pressure transversely to the axis of said layers to form an oval coherent body.

2. In a method of producing patterned objects, having the pattern extending throughout the thickness of the object from face to back from moulding powders of all kinds, colour and granulation, the improvement consisting in the steps of producing by centrifugal action in a mould successive layers of said powders, said layers filling said mould to a point closely adjacent the middle axis thereof.

3. In a method of producing patterned objects, having the pattern extending throughout the thickness of the object from face to back from moulding powders of all kinds, colour and granulation, the improvement consisting in the steps of producing by centrifugal action in a rotating mould, successive layers of said powders, each of a different colour, the said layers partly filling said mould and forming a ring-like body having a central bore; filling said bore with moulding powder and subsequently compressing said powders, said bore-filling powder uniting with said layers to form a coherent mass.

4. In a method of producing patterned objects, having the pattern extending throughout the thickness of the object from face to back, from moulding powders of all kinds, colour and granulation, the improvement consisting in the steps of producing by centrifugal action, in a rotating mould, successive layers of said powders, each of a different colour, the said layers partly filling said mould and forming a ring-like body having a central bore; filling said bore with a core of pre-compressed moulding powder; and subsequently compressing said layered powder and said core.

5. In a method of producing patterned objects, having the pattern extending throughout the thickness of the object from face to back from moulding powders of all kinds, colour and granulation, the improvement consisting in producing by centrifugal action in a rotating mould, successive layers of powder whilst varying the speed of rotation of said mould.

6. In a method of producing patterned objects, the step of: forming in a mould by centrifugal action successive layers of moulding powders of different colours and each of said layers consisting only of a single colour, whereby objects having a pattern extending throughout the thickness of the objects are produced.

7. In a method of producing patterned objects, the steps of: forming in a mould by centrifugal action successive layers of moulding powders of different colours and each of said layers consisting only of a single colour and subsequently compressing said layers whereby objects having a pattern extending throughout the thickness thereof are obtained.

8. In a method of producing bar-like patterned objects, the steps of: introducing moulding powder into a mould, rotating said mould around a horizontal axis to cause said powder to be projected against the wall thereof by centrifugal action to form a ring; introducing successively moulding powders each of a different colour, whilst maintaining said mould rotating; and subsequently compressing said layers whereby bar-like objects having the pattern extending throughout the thickness thereof are produced.

9. In a method of producing patterned objects, the steps of: forming in a mould by centrifugal action successive layers of moulding powders each of a different colour and subsequently applying heat and pressure to said plurality of powder layers to form a coherent body, whereby objects having a pattern extending throughout the thickness thereof are obtained.

10. In a method of producing disc-like patterned objects, the steps of: introducing moulding powder into a mould, rotating said mould around a vertical axis to cause said powder to be projected against the wall thereof by centrifugal action to form a ring; successively introducing further powder of different colours whilst maintaining said mould rotating; subsequently compressing said layers whereby a disc-like object having the pattern extending throughout the thickness thereof is obtained.

HANS SCHÄFER.